US006893519B1

(12) United States Patent
Barilovits et al.

(10) Patent No.: US 6,893,519 B1
(45) Date of Patent: May 17, 2005

(54) LABEL MARKING METHOD FOR MOVING WEB

(75) Inventors: Joseph Barilovits, Simpsonville, SC (US); John Barilovits, Gray Court, SC (US)

(73) Assignee: Barvit Industrial, LLC, Simpsonville, SC (US)

( * ) Notice: Subject to any disclaimer, the term of this patent is extended or adjusted under 35 U.S.C. 154(b) by 250 days.

(21) Appl. No.: 09/810,282

(22) Filed: Mar. 16, 2001

Related U.S. Application Data

(63) Continuation-in-part of application No. 09/522,975, filed on Mar. 10, 2000.

(51) Int. Cl.[7] .............................................. B32B 31/00

(52) U.S. Cl. ......................... 156/60; 156/247; 156/249

(58) Field of Search .......................... 156/60, 247, 249, 156/497; 428/40.1, 42.1, 42.2, 42.3, 41.7, 41.8; 40/638; 283/81

(56) References Cited

U.S. PATENT DOCUMENTS 2,095,437 A * 10/1937 Fox ........................... 206/813
4,166,144 A * 8/1979 Amberkar .................... 283/81
4,479,316 A * 10/1984 Wippern ..................... 156/289
5,098,759 A * 3/1992 Felix ......................... 428/42.2
5,351,426 A * 10/1994 Voy et al. ..................... 40/638
5,665,445 A * 9/1997 Carney, Jr. ................. 428/40.1
5,700,536 A * 12/1997 Steidinger .................... 283/81

* cited by examiner

*Primary Examiner*—Sue A. Purvis
(74) *Attorney, Agent, or Firm*—J.M. Robertson Intellectual Prop, LLC

(57) ABSTRACT

A method for marking a position along the length of a moving material web wherein a label having an adhesive pattern across its contact surface is attached to the edge of the web. A releasable adhesive extends across a central portion of the contact surface of the label, while opposing end portions of the contact surface are substantially adhesive free. The label is attached such that one adhesive free end portion projects outboard from the edge while the other adhesive free end portion is inboard of the edge.

19 Claims, 4 Drawing Sheets

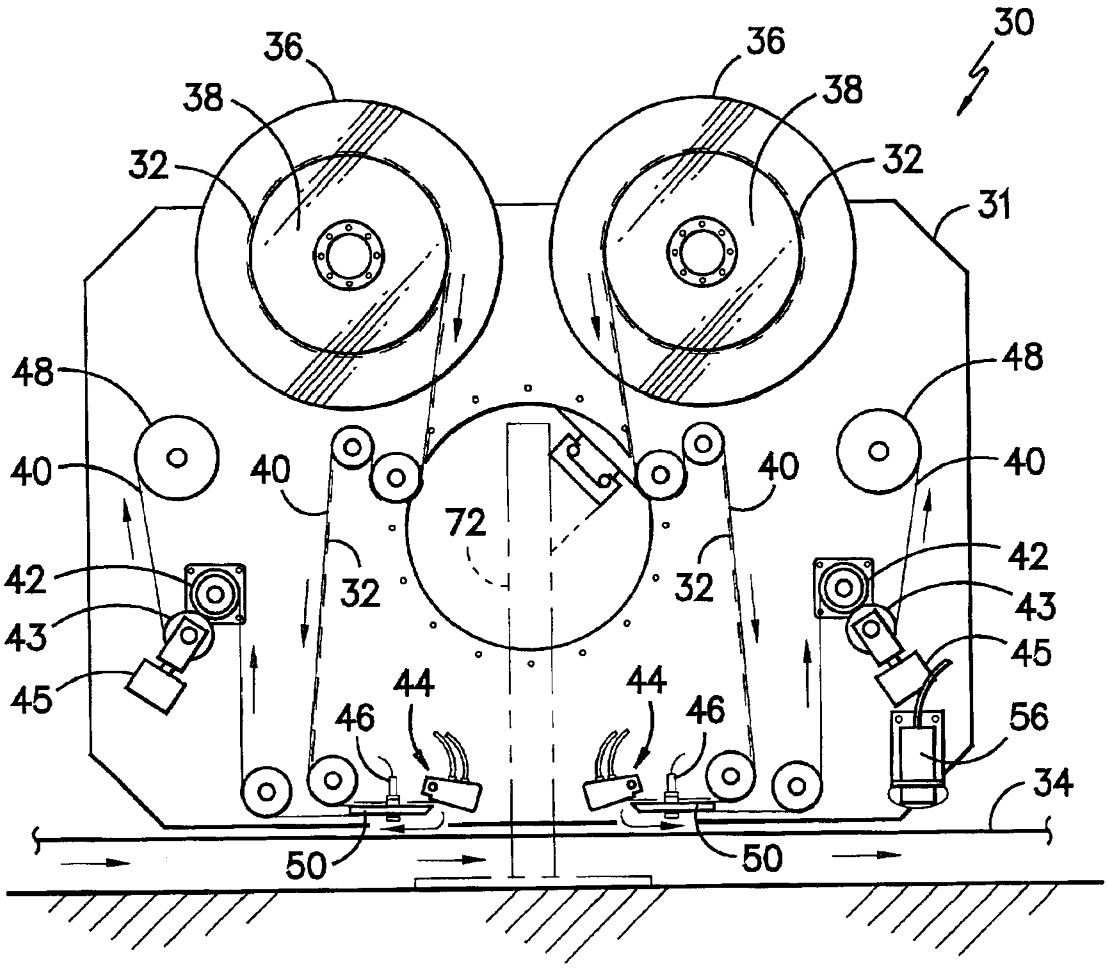
FIG. –1–

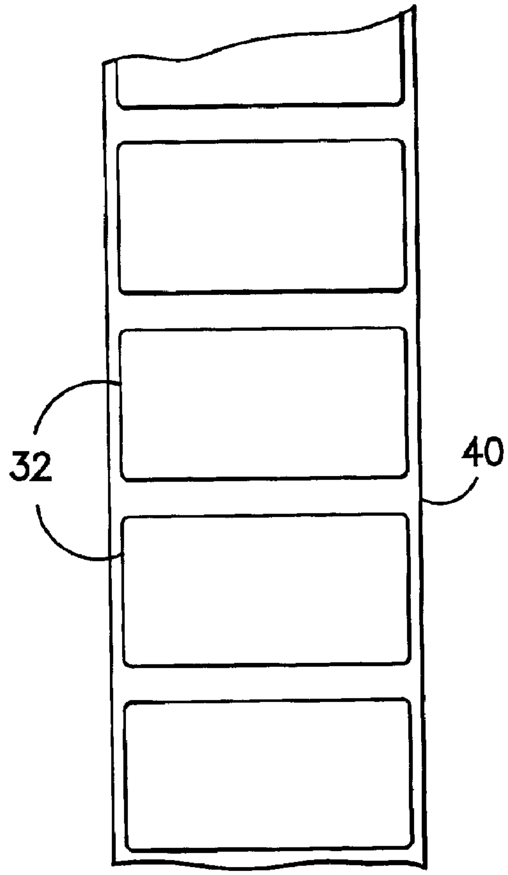
FIG. –2–
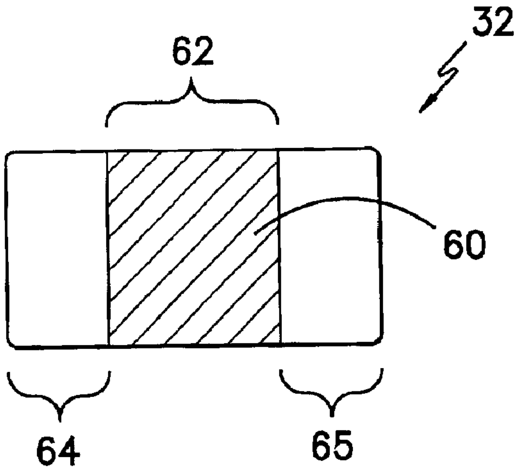
FIG. –3–

LABEL MARKING METHOD FOR MOVING WEB

CROSS REFERENCE TO RELATED APPLICATION

This application is a continuation-in-part of copending application Ser. No. 09/522,975 in the name of Joseph Barilovits and John Barilovits having a filing date of Mar. 10, 2000 the contents of which are incorporated herein in their entirety.

TECHNICAL FIELD

The present invention relates to peel-away adhesive patterned labels for manual or automated application to the edge of a material web, and more particularly to an adhesive patterned label having adhesive coverage over a central interior zone which is bounded by opposing adhesive free zones at either end of the label and a method of using such a label to mark a position along a length of moving web material.

BACKGROUND OF THE INVENTION

The production of a number of materials such as paper, films, textiles, and floor coverings, is carried out by forming such materials as elongated webs of substantial length which are thereafter segmented by cutting to yield lengths which are usable by the customer. While the character of the material along the length of the web may appear to be uniform, in many instances there will be variations along the length of such webs. These variations may arise for example in the form of slightly modified construction techniques which are intentionally introduced and/or in the form of either instantaneous or running defects within the material forming the web.

As will be appreciated by those of skill in the art, following production of the web material, the web may undergo an inspection process to identify the location and nature of variations along its length. Such inspection may be performed either manually and/or through use of automated equipment. In many instances it may be desirable to mark locations along the length of the material web by the placement of a removable label at such locations. In some instances, labels may be used to mark the location of abnormalities along the length of the material web. In other instances, it may be desirable to apply removable labels to segments of a material web which are destined for a particular customer or application. Such labels are generally removed at a later stage of processing and should thus be readily accessible for removal. At the same time, the labels must be held in place until removal is desired. Both the adhesion and removal of the labels must be carried out without causing damage to the material web.

In order to ensure easy removal of the applied labels, application generally takes place along the edge of the material web with a portion of the label projecting outwardly away from the edge of the web. Such placement permits the outwardly projecting portion to be grasped for removal. In order to prevent the outwardly projecting portion of the label from sticking to equipment or other structures outboard of the material web, it is known to utilize an adhesive pattern across the contact surface of the label such that one end of the label corresponding to the outwardly projecting portion is substantially free of adhesive.

Labels are typically stored in roll form on a carrier strip of paper or like material. The labels are peeled away from the carrier strip and applied to the edge of the material web at the desired locations. While prior labels of elongate rectangular geometry with an adhesive pattern having a single adhesive free end have typically performed well once they are applied, the use of such label elements gives rise to an inherent degree of complexity during application in that care must be taken to ensure that the labels are properly oriented relative to the edge of the material web before application can take place. That is, in order to ensure that the adhesive free zone protrudes away from the edge of the web material, the labels must be arranged differently on the carrier strip depending upon the arrangement of the material web and the application apparatus. Thus, if labels are to be applied to the material web using more than one system, rolls of labels having different orientations may be required. The use of such different labels may give rise to confusion and possible error.

SUMMARY OF THE INVENTION

The present invention provides advantages and alternatives over the prior art by providing a label having an adhesive pattern across its contact surface such that an adhesive extends across a central portion of the contact surface while opposing end portions of the contact surface are substantially adhesive free. The label is applied as a marker along an edge of a material web with one adhesive free end portion projecting outboard of the material web and with the other adhesive free end portion disposed inboard of the edge.

According to one aspect of the present invention, the label may be of a substantially rectangular geometry having a width dimension greater than its height dimension and wherein the label includes a contact surface with a substantially adhesive free zone extending inwardly from each end of the label towards an adhesive coating at the interior.

According to another aspect of the invention, the adhesive utilized by the label may be a releasable adhesive.

According to yet another aspect of the present invention the label may be carried on a carrier strip with a plurality of similar labels with the carrier strip being wound in roll form.

According to yet a further aspect of the present invention, the label may include a reflective upper show surface facing away from the contact surface.

According to yet a further aspect of the present invention, substantially adhesive free zones may extend a sufficient distance inwardly from each end to permit the end of the label to be grasped by manual or automated means substantially without adhesive interference.

While the invention has been generally described above and will hereafter be illustrated and more fully described in connection with certain potentially preferred embodiments, it is to be understood that the invention is in no way limited to such illustrated and described embodiments. To the contrary, it is contemplated that persons of skill in the art may make modifications to such preferred embodiments within the scope of the invention. Thus it is the intention of the applicants to cover all such alternatives and modifications as may fall within the true spirit and scope of the invention.

BRIEF DESCRIPTION OF THE DRAWINGS

An embodiment of the present invention is described below, by way of example only, with reference to the accompanying drawings in which:

FIG. 1 is an exemplary embodiment of a double roll label application unit;

FIG. 2 is a top plan view of a carrier strip conveying a plurality of labels according to the present invention;

FIG. 3 is a rear view of a label according to the present invention illustrating one potentially preferred adhesive pattern across the underside contact surface of the label.

DESCRIPTION OF THE PREFERRED EMBODIMENT

Figure 4A:
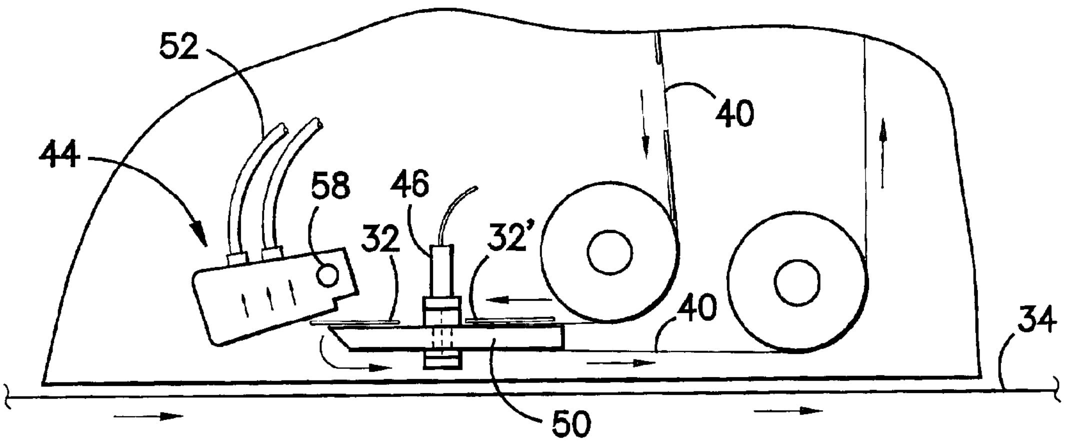
FIGS. 4A–D illustrate discharge of a label onto a moving material web using the application unit of FIG. 1.

Turning now to the figures, wherein like elements are designated by like reference characters throughout the various views, in FIG. 1 there is illustrated a side view of an exemplary label application unit 30 such as may be utilized to place label elements 32 according to the present invention onto a material web 34. One such application unit is illustrated and described in our U.S. patent application Ser. No. 09/522,975 having a filing date of Mar. 10, 2000, the contents of which are incorporated into this specification by reference as if fully set forth herein. As will be appreciated, the illustrated embodiment of the label application unit 30 which corresponds to such previous application is provided for exemplary and explanatory purposes only and is not to be considered as unduly limiting the scope of the present invention which is contemplated to have application in conjunction with any number of automated and/or manual application processes.

As shown, the illustrated label application unit 30 includes two substantially identical systems mounted in mirror image orientation to one another on a support frame 31 for application of label elements 32 to the edge of a moving web 34. However, the label application unit 30 may likewise incorporate a larger or smaller number of systems if desired.

As illustrated, each of the application systems preferably includes a spool device 36 for the storage and disposition of a tape roll 38. The tape roll 38 is formed from windings of a carrier tape 40. As illustrated, the label elements 32 are disposed on one side of the carrier tape 40 so as to be on the exterior of the tape roll 38 as the tape roll 38 is unwound. The label elements 32 are preferably held in place at regular spacing intervals along the length of the carrier tape 40 by a releasable adhesive 60 extending across an interior zone 62 of the underside of the label elements 32 (FIG. 3).

The releasable adhesive 60 is preferably patterned across the underside of the label elements 32 such that a pair of opposing substantially adhesive free zones 64, 65 extend between the releasable adhesive 60 and the edges of the label element 32. It is contemplated that the releasable adhesive 60 may be present across the interior zone 62 as a substantially continuous layer or may likewise be present in any other suitable pattern including by way of example only, a dot matrix or line pattern.

According to a potentially preferred practice, the label elements 32 are of a substantially rectangular geometry. However, any number of other geometries may likewise be used if desired. One potentially preferred geometry for the label elements 32 is a rectangle having a length dimension of about 2 inches and a height dimension of about 1 inch. In such a configuration the substantially adhesive free zones 64, 65 are preferably broad enough to permit grasping and removal when desired. At the same time, the adhesive 60 must cover a sufficient area to maintain good adhesion with the material web 34 prior to removal.

By way of example only, in a 2 inch by 1 inch label element, it has been found that an adhesive pattern incorporating adhesive free zones 64, 65 extending about $\frac{3}{16}$ inches to about $\frac{5}{8}$ inches inwardly from either end provides an excellent combination of adhesion and grasping ability. In such a geometry, adhesive free zones extending about $\frac{7}{16}$ inches inwardly from either end such that adhesive 60 extends across the remaining 1 and $\frac{1}{8}$ inches forming the interior zone 62 may be particularly preferred.

As previously indicated, the use of such patterned label elements 32 permits one of the adhesive free portions 64, 65 to protrude away from the edge of the marked web of material thereby reducing the possibility for undesired adhesion to a foreign surface. Such undesired adhesion may result in the label element being pulled away prematurely. In addition, use of label elements 32 having no adhesive on either end provides the added advantage of eliminating the potential for operator error when loading the tape roll 38 onto the spool device 36. As will be appreciated, in the event that a label application unit 30 incorporating more than one spool device 36 is in use, the utilization of the label elements 32 according to the present invention permits placement of the tape roll on the spool device with no concern that the label elements 32 are oriented incorrectly on the carrier tape 40. Thus, in a multi-spool apparatus, the need for different label orientations on different spools is eliminated. Surprisingly, it has been found that the absence of adhesive across the entire surface in contact with the material web 34 does not substantially detract from the necessary adhesion between the label elements 32 and the material web 34.

By way of example only, the application of the label elements 32 may be carried out using the label application unit 30 as illustrated in FIG. 1. During such application, the carrier tape 40 is withdrawn from the tape rolls 38 by the application of a pulling force initiated by stepper motors 42 which are periodically activated by a programmable logic controller (not shown) as required to feed discrete label elements 32 to label discharge mechanisms 44 for application to the moving material web 34. The programmable logic controller may immediately or after a delay activate one of the stepper motors 42 after each label is applied thereby providing a corresponding label discharge mechanism 44 with a new label for subsequent application. In operation, the stepper motor 42 will be activated immediately if the need to place the next label 32 is imminent, while a delay will be imposed if a label is not required for application for some predetermined period of time.

The pulling force applied by the stepper motor 42 is discontinued once the new label has been fed to the label discharge mechanism 44. Termination of the stepper motor 42 is preferably based upon a signal provided to the programmable logic controller from an optical sensor 46 associated with each label discharge mechanism 44 indicating that the label has been fed into place. The carrier tape 40 is preferably taken up by motor driven take-up spools 48 which operate in conjunction with the corresponding stepper motors 42. In the illustrated unit a floating nip roll 43 is used to prevent slippage between the carrier tape 40 and the stepper motor 42. The floating nip roll 43 is preferably held in place by a compressible cylinder support 45. In the event that the carrier tape 40 should break and begin to accumulate around the stepper motor, the floating nip roll is forced back by the accumulating carrier tape thereby compressing the cylinder support. Once such compression reaches a predetermined level, a limit switch is tripped thereby terminating further operation of the stepper motor 42 until the carrier tape 40 is arranged properly.

Figure 4B:
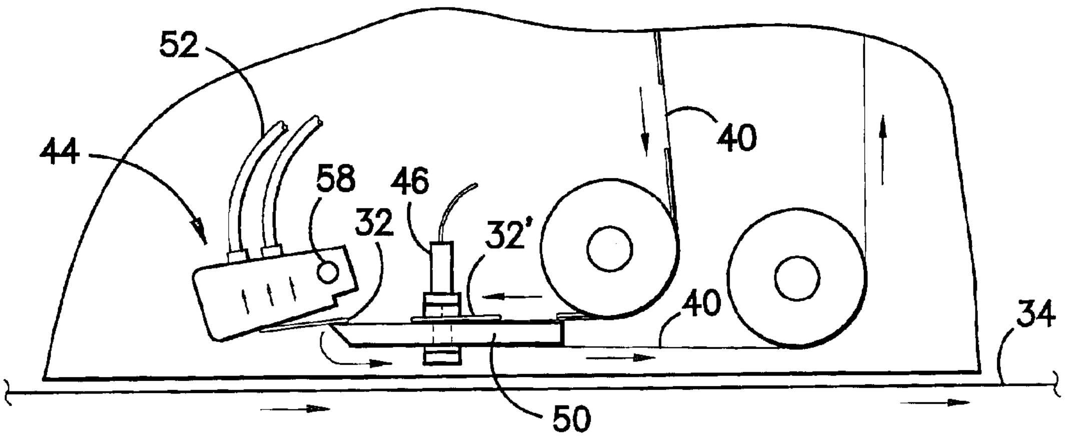

One potentially preferred procedure for placement of individual label elements 32 onto the moving web 34 is illustrated in FIGS. 4A–4D. As shown in FIG. 4A, a carrier tape 40 carrying a plurality of discrete label elements 32 is preferably conveyed around the nose of the take-off plate 50 adjacent to a label discharge mechanism 44. As best illustrated in FIG. 4B, as the carrier tape 40 bends around the nose of the take-off plate 50 so as to reverse direction away from the label discharge mechanism 44, the leading label element 32 tends to peel away from the carrier tape 40. This peeling away phenomenon arises due to the fact that the adhesive 60 which holds the label element 32 to the carrier tape 40 is of a releasable nature such that the shear forces applied between the label element 32 and the carrier tape 40 which arise as the carrier tape 40 is conveyed around the radius of curvature formed by the nose of the take-off plate 50 are sufficient to overcome the adhesive bond between the label element 32 and the carrier tape 40. As indicated previously, the releasable nature of the adhesive 60 on the label element 32 is likewise useful in permitting the removal of the label element 32 from the material forming the material web 34 at later stages of material processing.

As the leading label element 32 is peeled away from the carrier tape 40, it will tend to continue in a path of travel generally parallel to the upper surface of the take-off plate 50. According to the illustrated and potentially preferred embodiment of the present invention, this continued conveyance brings the label element 32 into contact with the underside of the label discharge mechanism 44 (FIG. 4B). As shown, the angle of the label discharge mechanism 44 relative to the conveyed label element 32 is such that contact is assured between the label element 32 and the underside of the label discharge mechanism 44.

In the illustrated apparatus the label discharge mechanism is an articulating vacuum grid which includes a plurality of flexible feed lines 52 which are operatively connected to a reversible vacuum pump (not shown). This vacuum pump is of such a nature that a vacuum may be pulled across the label discharge mechanism 44 at a level sufficient to hold a label element 32 in place against the underside of the discharge mechanism 44. Thus, at the position as generally illustrated in FIG. 4B, the label element 32 is prevented from falling by a combination of both its internal stiffness as well as the vacuum force applied through the label discharge mechanism 44.

Figure 4C:
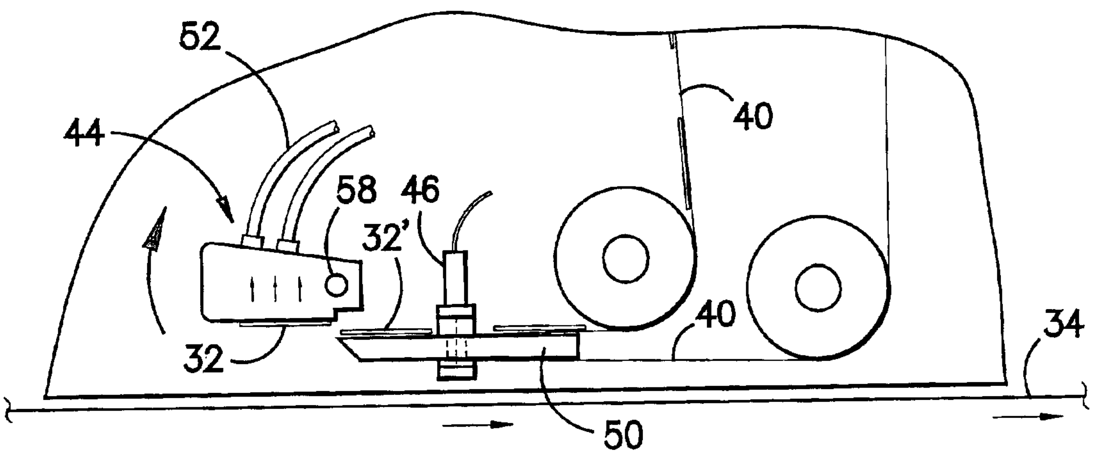
Figure 4D:
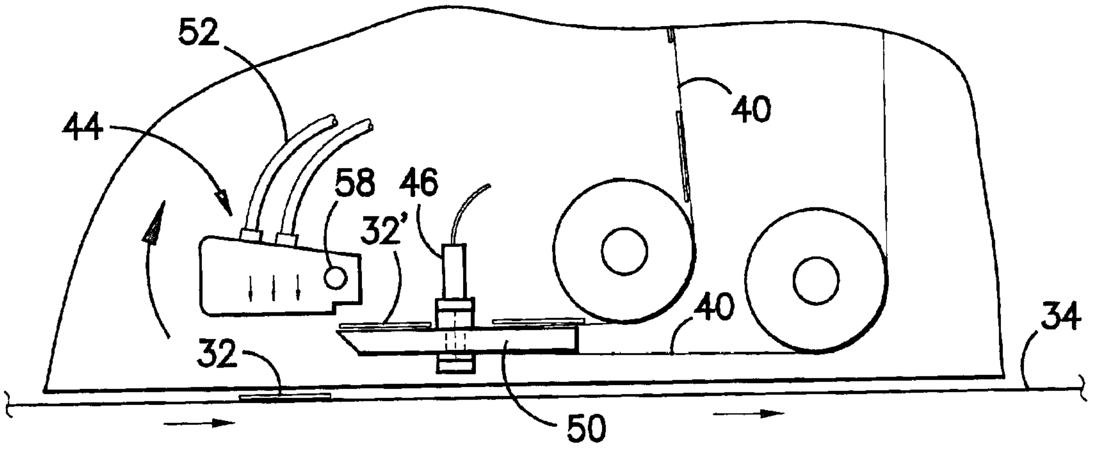

As illustrated in FIG. 4C, the procedure of peeling the label element 32 away from the carrier tape 40 may be completed by swinging the label discharge mechanism 44 downwardly around a pivot point 58 so as to bring the label element 32 into a substantially parallel relation to the moving web material 34. As shown, the pivot point is preferably selected so as to move the underside of the label discharge mechanism 44 away from the take-off plate 50 as such rotation takes place thereby effecting a corresponding lateral movement of the label element 32 away from the take-off plate 50 and carrier tape 40 carried thereon. Such outward movement avoids any possible interference between the label discharge mechanism 44 and the take-off plate 50 during subsequent label application. Of course, it is to be understood that any number of alternative embodiments and practices may also be utilized to peel the label element 32 away from the carrier tape 40 including both manual and/or automated processes. By way of example only, and not limitation, it is contemplated that the label discharge mechanism 44 may be stationary and that the take-off plate 50 may be moveable in a substantially linear manner so as to bring the label element 32 into an underlying relation with such label discharge mechanism 44. In the event that the web is moving slowly or is substantially stationary such as a piece of paper in an office environment, it is contemplated that placement of the label element 32 may be performed manually.

In the automated application practice illustrated, the label element 32 assumes an operative position substantially parallel relative to the moving web material 34. Upon actuation by the programmable logic controller, the vacuum across the discharge mechanism 44 is terminated and is replaced with a pressurized driving force in the form of compressed air communicated through the feed lines 52 so as to cause forcible dispatch of the retained label element 32 away from the label discharge mechanism 44 and onto the moving material web 34 (FIG. 4D) such that at least a portion of one of the substantially adhesive free zones 64, 65 protrudes outwardly away from the edge of the material web 34. The remainder of the label element 32 including the other of the substantially adhesive free zones 64, 65 extends from the edge of the material web 34 inwardly towards the interior of the material web 34. According to the potentially most preferred practice, no portion of the adhesive covered interior zone 60 extends outboard of the material web 34.

In the illustrated and potentially preferred application process, dispatch of the label element 32 is carried out by blowing the label element 32 into place without the use of mechanical contact between the label discharge mechanism 44 and the moving material web 34. Such placement procedure is believed to have the advantage of accommodating webs of varying thickness without the need for adjustment of the label discharge mechanism 44.

In the event that the material web is traveling at a relatively high rate of speed, the actuation of the placement process is preferably initiated before the location to be marked reaches the application zone directly opposing the label discharge mechanism 44. The duration of such lead time is dependent upon the instantaneous speed of the moving web 34 and is calculated such that the location designated to receive the label element 32 reaches the position opposing the label discharge mechanism 44 as the placement of the label element 32 is completed.

In the event that another label is to be applied, once the placement of a label element 32 has been completed the label discharge mechanism 44 may immediately or after a delay return to a position as illustrated in FIG. 4A for acceptance of a new label element. Upon the label discharge mechanism 44 assuming the position for acceptance of a new label element, the corresponding stepper motor 42 is activated and commences to pull the carrier tape 40 supporting the new label element 32 around the nose of the takeoff plate 50 as shown in FIG. 4B. As the label element 32 is being loaded onto the label discharge mechanism 44, the optical sensor 46 monitors the extent of travel of the carrier tape 40 and label elements carried thereon. The label elements 32 are preferably of a nature such that the optical sensor 46 can readily detect their presence. Label elements 32 having a highly reflective metallic coating across their upper surface may be particularly preferred.

According to one potentially preferred placement practice, the optical sensor 46 is arranged along the length of the takeoff plate 50 at a position such that during the loading of the leading label element 32 onto the label discharge mechanism 44 the trailing label element 32' will travel past the optical sensor 46. Once the trailing label element 32' has passed the optical sensor 46, the optical sensor 46 preferably sends a signal to terminate further movement of the carrier tape 40. Thus, through selection of the location for the optical sensor 46, movement of the carrier tape 40 may be terminated precisely when the label element 32' reaches the appropriate position for subsequent loading onto the label discharge mechanism 44.

As indicated previously, the adhesive 60 as is utilized on the label elements 32 is preferably of a substantially releasable nature such that the label elements 32 may be peeled away from the carrier tape 40 as well as from the moving web 34. In order to enhance the adhesion of such releasable adhesive, the label discharge mechanism 44 is preferably maintained in a heated condition at about 30 to 80 degrees Fahrenheit above ambient.

According to one potentially preferred practice, a placement sensor 56 (FIG. 1) is utilized to confirm the placement and adhesion of the label elements 32 as they are applied to the moving material web 34. For label elements 32 which are of a metallic character, the placement sensor 56 is preferably a metallic sensor such as the model AT1-AP-4A inductive proximity sensor available from Automationdirect.com which is believed to have a place of business in Cumming, Ga. USA. In the event that a label is not detected by the placement sensor 56 at the proper placement location, an alarm is sounded and an error message is communicated to the operator. Of course, other appropriate sensors as may be known to those of skill in the art may be used to detect the placement of nonmetallic labels.

In the event that placement of the label elements 32 is carried out using labels fed to substantially independent systems from more than one location in the manner shown, these independent systems may be used either independently or in conjunction with one another to effect the desired placement of the label elements. That is, the label discharge mechanisms 44 may be used alternately to place individual label elements 32 upon the moving material web 34 or may be operated substantially independently of one another. Moreover, in the event that one or more components of either system becomes dysfunctional, it is contemplated that application may nonetheless proceed using the components of the other application system until necessary repairs may be undertaken.

It is contemplated that placement of the label elements 32 may be used for marking any number of different types of material forming the material web 34. By way of example only and not limitation, such placement may be particularly useful in marking positions along lengths of textile or paper webs moving at high rates of speed although other materials in either static or dynamic states may likewise be marked if desired.

While the present invention has been illustrated and described in relation to particular potentially preferred embodiments practices and procedures, it is to be understood that such embodiments, practices and procedures are illustrative only. Accordingly it is not the intention that the invention be limited to such illustrated and described embodiments, but rather than the invention will extend to the full spirit and scope of the claims appended hereto.

What is claimed is:

1. A method for marking a position along the length of a moving material web, the method comprising: attaching a removable label to an edge of the material web to be marked, wherein the label comprises an upper show surface and a contact surface facing away from the upper show surface for contacting the material web, the contact surface having an adhesive zone of a releasable adhesive extending across an interior portion of the contact surface and a pair of opposing substantially adhesive free zones extending between the adhesive zone and opposing perimeter edges of the label, the label being attached to the edge of the material web by the releasable adhesive with one of said pair of opposing substantially adhesive free zones projecting substantially outboard of the material web and with the other of said pair of opposing substantially adhesive free zones being disposed inboard of the edge of the material web such that the portion of the label projecting outboard from the edge of the material web is substantially adhesive free.

2. The invention according to claim 1, wherein the upper show surface is of a substantially reflective metallic character.

3. The invention according to claim 1, wherein said label is substantially rectangular in geometry having a top edge, a bottom edge and two lateral edges.

4. The invention according to claim 3, wherein the adhesive zone is disposed substantially at the center of the contact surface and wherein one of said pair of substantially adhesive free zones extends between the adhesive zone and each of said two lateral edges.

5. The invention according to claim 4, wherein the adhesive zone occupies not greater than about 75 percent of the total surface area of the contact surface.

6. The invention according to claim 4, wherein the adhesive zone occupies less than about 70 percent of the total surface area of the contact surface.

7. The invention according to claim 4, wherein the adhesive zone occupies less than about 60 percent of the total surface area of the contact surface.

8. The invention according to claim 1, wherein the material web comprises a textile fabric.

9. The invention according to claim 1, wherein the label is heated prior to being attached to the edge of the material web.

10. The invention according to claim 1, wherein the material web comprises a textile fabric.

11. The invention according to claim 1, wherein the label is heated prior to being attached to the edge of the material web.

12. A method for marking a position along the length of a moving material web, the method comprising: expelling a removable label onto the material web to be marked from a position at a spaced distance away from the material web for adherence at a predetermined position along the edge of the material web, wherein the label comprises an upper show surface and a contact surface facing away from the upper show surface for contacting the material web, the contact surface having an adhesive zone of a releasable adhesive extending across an interior portion of the contact surface and a pair of opposing substantially adhesive free zones extending between the adhesive zone and opposing perimeter edges of the label, the label being attached to the edge of the material web by the releasable adhesive with one of said pair of opposing substantially adhesive free zones projecting substantially outboard of the material web and with the other of said pair of opposing substantially adhesive free zones being disposed inboard of the edge of the material web such that the portion of the label projecting outboard from the edge of the material web is substantially adhesive free.

13. The invention according to claim 12, wherein the upper show surface is of a substantially reflective metallic character.

14. The invention according to claim 12, wherein said label is substantially rectangular in geometry having a top edge, a bottom edge and two lateral edges.

15. The invention according to claim 14, wherein the adhesive zone is disposed substantially at the center of the contact surface and wherein one of said pair of substantially adhesive free zones extends between the adhesive zone and each of said two lateral edges.

16. The invention according to claim 15, wherein the adhesive zone occupies not greater than about 75 percent of the total surface area of the contact surface.

17. The invention according to claim 15, wherein the adhesive zone occupies less than about 70 percent of the total surface area of the contact surface.

18. The invention according to claim 15, wherein the adhesive zone occupies less than about 60 percent of the total surface area of the contact surface.

19. A method for marking a position along the length of a moving material web, the method comprising: attaching a removable label to an edge of the material web to be marked, wherein the label is substantially rectangular in geometry bounded by a top edge, a bottom edge and two lateral edges, the label comprising an upper show surface and a contact surface facing away from the upper show surface for contacting the material web, the contact surface having a substantially centrally disposed adhesive zone of a releasable adhesive and a pair of opposing substantially adhesive free end zones extending between the adhesive zone and each of said two lateral edges, the label being attached to the edge of the material web by the releasable adhesive with one of said pair of opposing substantially adhesive free zones projecting substantially outboard of the material web and with the other of said pair of opposing substantially adhesive free zones being disposed inboard of the edge of the material web, such that the portion of the label projecting outboard from the edge of the material web is substantially adhesive free.

* * * * *